United States Patent
Chien et al.

(10) Patent No.: US 9,584,773 B2
(45) Date of Patent: Feb. 28, 2017

(54) SAFETY MONITORING SYSTEM CAPABLE OF PROACTIVELY DETECTING LOCATIONS OF TERMINAL DEVICES

(71) Applicant: D-Link Corporation, Taipei (TW)

(72) Inventors: Ying-Zhe Chien, Taipei (TW); Po-Yen Chang, Taipei (TW); Jia-Ming Liang, Taipei (TW); Yu-Chee Tseng, Taipei (TW)

(73) Assignee: D-LINK CORPORATION, Taipei (TW)

( * ) Notice: Subject to any disclaimer, the term of this patent is extended or adjusted under 35 U.S.C. 154(b) by 291 days.

(21) Appl. No.: 14/313,379

(22) Filed: Jun. 24, 2014

(65) Prior Publication Data

US 2015/0281656 A1    Oct. 1, 2015

(30) Foreign Application Priority Data

Mar. 28, 2014   (TW) .............................. 103111683 A

(51) Int. Cl.
*H04N 7/18* (2006.01)
*H04L 29/08* (2006.01)
*H04L 29/06* (2006.01)
*H04W 4/02* (2009.01)

(52) U.S. Cl.
CPC ............ *H04N 7/183* (2013.01); *H04L 67/18* (2013.01); *H04L 67/42* (2013.01); *H04N 7/181* (2013.01); *H04W 4/02* (2013.01)

(58) Field of Classification Search
IPC ...................................................... H04N 7/183
See application file for complete search history.

(56) References Cited

U.S. PATENT DOCUMENTS

| | | | |
|---|---|---|---|
| 2013/0035109 A1* | 2/2013 | Tsruya ................. | G01S 5/0252 455/456.1 |
| 2014/0162693 A1* | 6/2014 | Wachter ............... | H04W 4/021 455/456.3 |
| 2015/0039744 A1* | 2/2015 | Niazi .................. | H04L 43/0876 709/224 |

* cited by examiner

*Primary Examiner* — Tracy Y Li
(74) *Attorney, Agent, or Firm* — Bacon & Thomas, PLLC

(57) ABSTRACT

The present invention is to provide a safety monitoring system, which includes a plurality of terminal devices (e.g., smartphones) each configured to wirelessly and periodically send out a report message and a home server storing positioning data created according to the strengths of signals transmitted by each terminal device from different locations within an indoor environment (e.g., an apartment) respectively. According to the positioning data, the home server divides the indoor environment into a plurality of monitoring areas (e.g., living room, bathrooms, kitchen . . . ). When the home server receives the report message and determines the monitoring area where each terminal device is located according to the positioning data, the home server uploads entry of identification data and the monitoring area corresponding to each terminal device to a cloud server through the Internet. Thus, the current status of the carrier of each terminal device can be checked through the cloud server.

12 Claims, 1 Drawing Sheet

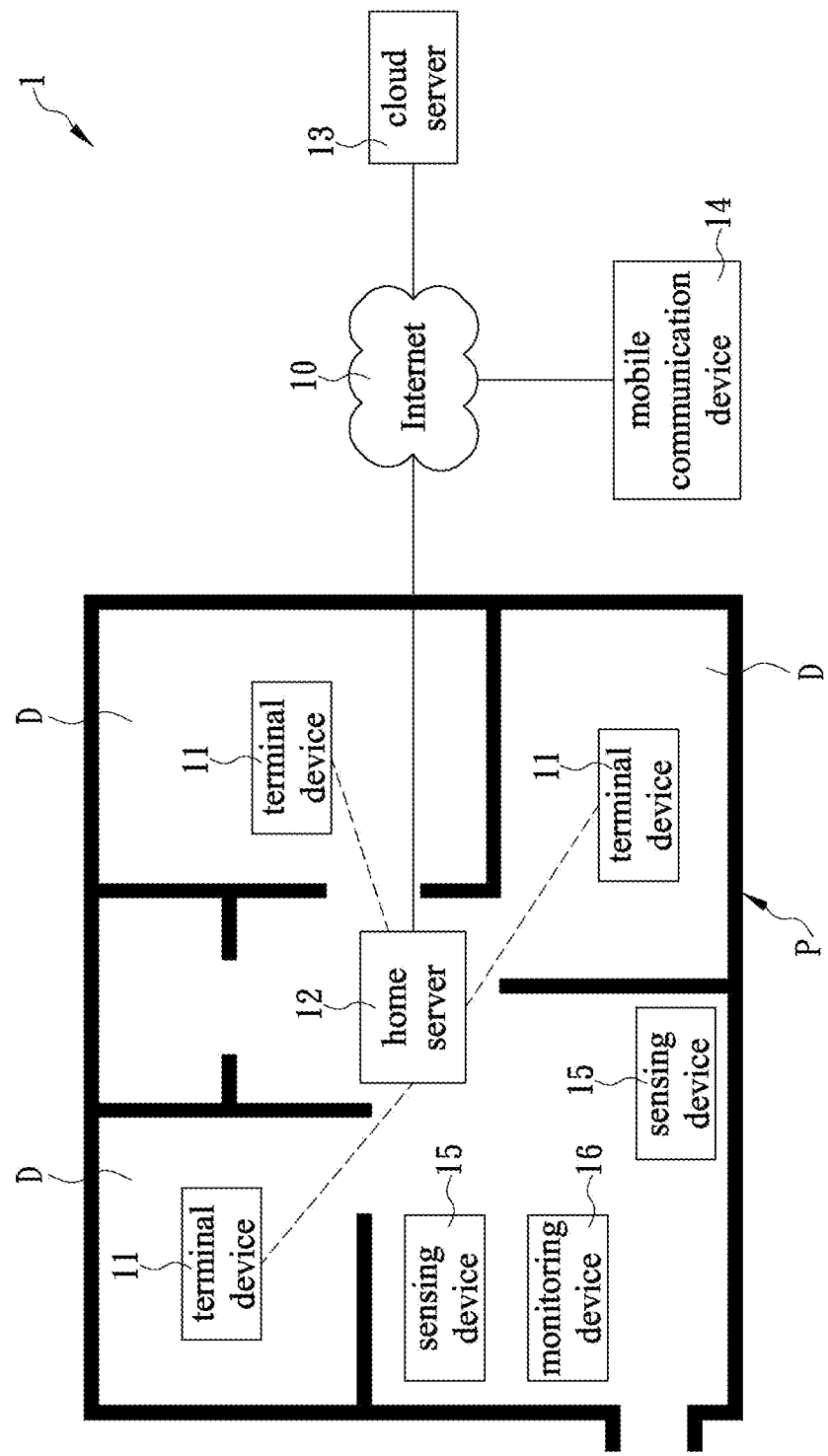

SAFETY MONITORING SYSTEM CAPABLE OF PROACTIVELY DETECTING LOCATIONS OF TERMINAL DEVICES

FIELD OF THE INVENTION

The present invention relates to a safety monitoring system, more particularly to a safety monitoring system applicable to an indoor environment (e.g., an apartment) and capable of proactively detecting locations (e.g., a vestibule, a living room, a number of bathrooms, a kitchen, and so on) of a plurality of terminal devices (e.g., smartphones) within the indoor environment through a cloud server in the Internet.

BACKGROUND OF THE INVENTION

Recently, with the aging of population and the declining of fertility rate, the social structure and lifestyle in Taiwan are changing significantly. According to a survey conducted by the Directorate-General of Budget, Accounting and Statistics of Taiwan, dual-income families currently make up 54.47% of the household population. On work days, therefore, many people leave their homes unattended, or the young and the elderly are left home alone. Under such circumstances, domestic security has become a major concern for not a few homeowners. In addition, statistics of the Directorate-General show that an average of 881 thefts occur each year per 100 thousand households in Taipei City; that is to say, 6.5 homes on average are stolen each day. In light of the above, it is an important goal in domestic security to enable a homeowner away from home to monitor the conditions at home in real time.

While the market has been supplied with a variety of remote surveillance systems, none of them are convenient to use, which explains why they have yet to be widely accepted. For example, Chunghwa Telecom once launched the "Clairvoyance Remote Surveillance System", which uploads real-time images of the inside of a home to a cloud server through IP cameras and a household broadband network so that the user (e.g., the homeowner or an apartment manager) can view the images in real time through a computer or smartphone. Similar safety surveillance systems were also available from SunForce Technologies Inc., SOPSYS Corp., and so on. As these surveillance systems only serve to upload images from IP cameras to a cloud serer in real time, one who wishes to check on the conditions at home has to view the surveillance images of each IP camera in order to know the current status of any particular person at home. For instance, in order to know the current conditions of a child at home, the user may begin by viewing the surveillance images of the study, the bedrooms, and the hallways while the child is, in fact, playing in the living room, whose surveillance images, however, may not be viewed by the user until the study, the bedrooms, and the hallways are searched in vain. In short, this kind of surveillance systems upload surveillance images only "passively", without real-time knowledge of the actual location of each person within the surveillance area, which can cause great inconvenience to the user during the image viewing/screening process.

Aside from inconvenience of use, the aforesaid surveillance systems have two more problems which are difficult to overcome and which consequently prevent the prevalence of such systems, as detailed below.

(1) High costs of installation: The installation costs are high because, in order to obtain the surveillance images of each part of the surveillance area (e.g., the study, the bedrooms, the hallways, etc.), it is imperative that each part of the surveillance area be provided with a monitoring device (e.g., an IP camera). The user must also take into account the indoor environment and eliminate any blind spots when installing the surveillance system; otherwise, the system may not produce the expected results. The installation of such surveillance systems, therefore, is far from easy for ordinary users.

(2) Heavy loads on servers: As the foregoing surveillance systems are configured to upload surveillance images to cloud servers in real time to allow users to view the images whenever desired, the processing performances and storage capacities of the cloud servers are subject to very strict requirements in order for the cloud servers to provide the intended functions. Consequently, the maintenance and management of the cloud servers present a huge problem to the service providers of such surveillance systems.

According to the above, the existing surveillance systems are disadvantaged by "inconvenience of use", "high installation costs", and "heavy server loads". In particular, the conventional systems' incapability to proactively obtain the actual location of each person in the surveillance area is the reason why users have to spend a lot of time screening the images and is therefore the key problem that hinders "real-time surveillance". The issue to be addressed by the present invention is to design a novel system structure which can obtain the real-time location data of each person in the surveillance area and thereby provide convenient, real-time, and effective remote monitoring services.

BRIEF SUMMARY OF THE INVENTION

In view of the inconveniences arising from the conventional surveillance systems' incapability to obtain the actual location of each person in the surveillance area in real time, the inventor of the present invention incorporated years of practical experience into extensive research, survey, and tests and finally succeeded in developing a safety monitoring system capable of proactively detecting the locations of terminal devices. The system is intended to provide the general public with convenient remote monitoring services.

It is an object of the present invention to provide a safety monitoring system capable of proactively detecting the locations of terminal devices. The safety monitoring system is applicable to an indoor environment (e.g., an apartment) and includes a plurality of terminal devices (e.g., smartphones) and a home server. Each terminal device is configured to periodically send out a report message using a wireless transmission technique (e.g., WiFi). The home server stores positioning data and plural entries of identification data. The positioning data are created by the home server by applying a wireless positioning technique to the analysis of the strengths of signals transmitted by each terminal device from different locations in the indoor environment respectively and by recording the analysis results. According to the positioning data, the home server divides the indoor environment into a plurality of monitoring areas (e.g., a vestibule, a living room, a number of bathrooms, a kitchen, and so on). Each entry of the identification data corresponds to one of the terminal devices. When the terminal devices are in the indoor environment, the home server makes wireless connection with each terminal device separately in order to receive the report message sent by each terminal device. Then, using the wireless positioning technique, the home server analyzes the signal strength of each terminal device and determines the monitoring area where each terminal device is located according to the positioning data. After that, the home server uploads the identification data and monitoring area corresponding to each terminal device to a cloud server through the Internet. As the home server obtains the locations of all the terminal devices and uploads the locations to the cloud server in a proactive manner, the user of the system can connect to the cloud server and check on the current status of the carrier of each terminal device (e.g., child #1 being in the living room, elderly family member #1 being in bathroom A) at any time even if the user is away from the indoor environment.

The second object of the present invention is to provide the foregoing safety monitoring system, wherein the terminal devices are smartphones configured for signal transmission through a WiFi, Bluetooth, or other wireless transmission technique. Thus, the safety monitoring system of the present invention does not require a monitoring device (e.g., a camera) to be installed in each monitoring area, and because of that, the installation costs of the system are substantially lower, and flexibility of use substantially higher, than those of the conventional surveillance systems.

The third object of the present invention is to provide the foregoing safety monitoring system, wherein the home server further stores plural entries of monitoring data. Each entry of the monitoring data corresponds to one entry of the identification data and at least includes a time parameter and an area parameter. The home server sends a warning message to the cloud server upon determining that any of the terminal devices has stayed in a particular monitoring area for a time exceeding the corresponding time parameter (e.g., elderly family member #1 staying in bathroom A for more than 30 minutes) or that the monitoring area where a particular terminal device is located does not match the corresponding area parameter while the current time matches the corresponding time parameter (e.g., child #1 not having entered bedroom A by nine o'clock).

BRIEF DESCRIPTION OF THE SEVERAL VIEWS OF THE DRAWINGS

The technical features, system structure, and objects of the present invention will be best understood by referring to the following detailed description of some illustrative embodiments in conjunction with the accompanying drawings, in which:

FIG. 1 is a schematic drawing of the safety monitoring system of the present invention.

DETAILED DESCRIPTION OF THE INVENTION

Based on his years of practical experience in the development of network-related products, the inventor of the present invention found that the problems of the existing remote surveillance systems such as "inconvenience of use", "high installation costs", and "heavy server loads" result mainly from the way in which the systems are designed to work, i.e., capturing surveillance images and uploading the obtained images to a cloud server for view by the user. This operation scheme not only is costly in terms of installation, but also is inefficient because, in most of the time, the images that the user wishes to view come only from a small portion of the surveillance area. In addition, the cloud server will not take the initiative and determine whether each surveillance image is meaningful (e.g., showing an abnormal condition), so the user has to view each and every surveillance image to ensure domestic security.

It then occurred to the inventor that the various problems of the conventional surveillance systems can be easily solved by incorporating the terminal device(s) (e.g., a smartphone, tablet computer, and so on) that a person carries into remote monitoring services. Referring to FIG. 1 for a schematic drawing of the safety monitoring system capable of proactively detecting the locations of terminal devices in the present invention, the safety monitoring system 1 is applied to an indoor environment P and includes a plurality of terminal devices 11, a home server 12, and a cloud server 13. Each terminal device 11 is carried by one person in the indoor environment P and is therefore freely movable with that person within the indoor environment P.

Before using the safety monitoring system 1, the user (e.g., a homeowner, or one who is frequently away from the indoor environment P and needs to know the conditions of the indoor environment P in real time) has to set the home server 12. To begin with, wireless connection is established between each terminal device 11 and the home server 12 (e.g., via WiFi or Bluetooth) so that the home server 12 can create identification data for and thereby identify each terminal device 11. Then, the home server 12 receives a report message from each terminal device 11 and thus obtains data regarding to the signal strengths of the report messages that the home server 12 can receive from each terminal device 11 when each terminal device 11 is differently located in the indoor environment P. According to the user's settings, the home server 12 stores the aforesaid signal strength data as positioning data, and the indoor environment P is divided by the home server 12 into a plurality of monitoring areas D (e.g., a vestibule, a living room, a number of bath rooms, a number of bedrooms, and so on) based on the positioning data.

Once the safety monitoring system 1 is activated, and the persons carrying the terminal devices 11 are in the indoor environment P, each terminal device 11 makes wireless connection with the home server 12 automatically if the terminal device 11 determines that the strengths of signals to and from the home server 12 are great enough to establish the connection. More specifically, each terminal device 11 sends out the report message periodically using an applicable wireless transmission technique. The home server 12 receives the report message sent by each terminal device 11 and uses a wireless positioning technique to determine the signal strength of each terminal device 11 and then the monitoring area D where each terminal device 11 is located according to the signal strengths and the pre-stored positioning data. After that, the home server 12 uploads the identification data of each terminal device 11 and the monitoring area D where each terminal device 11 is located (e.g., "elderly family member #1 in bathroom A", "child #1 in bedroom B", etc.) to the cloud server 13 through the Internet 10.

As the home server 12 is configured to obtain the locations of all the terminal devices 11 and upload the locations to the cloud server 13 proactively, the user can connect to the cloud server 13 and check on the current state of the carrier of each terminal device 11 (e.g., child #2 in the living room, elderly family member #2 in bathroom B, etc.) even if the user is away from the indoor environment P. Moreover, since the real-time location of each terminal device 11 is determined in the present invention by means of a wireless positioning technique, smartphones can be used as the terminal devices 11, thereby eliminating the need to install an IP camera in each monitoring area D. When it is desired to check on the conditions of the indoor environment P, the user does not have to view the surveillance images of each monitoring area D as is conventionally required; rather, he or she can rapidly know the conditions of the indoor environment P from the identification data and monitoring areas D displayed on the cloud server 13. As such, the safety monitoring system 1 features convenience of use and relatively low installation costs as compared with its prior art counterparts.

In this embodiment, a specific safety monitoring program (e.g., an application, or APP, for use in a smartphone) is installed in each terminal device 11 and the user's mobile communication device 14. The safety monitoring programs enable the terminal devices 11 to automatically send out the report messages, and the user to connect to the cloud server 13 through the mobile communication device 14 and, after identification verification, view the identification data and the corresponding monitoring areas recorded in the cloud server 13.

In this embodiment, the safety monitoring system 1 cannot perform wireless positioning correctly unless it is preset to obtain such data as the signal strengths corresponding to each monitoring area D. In other embodiments of the present invention, however, wireless positioning can be carried out in other ways. For example, the safety monitoring system 1 may determine the relative positions of the terminal devices 11 through network devices (e.g., routers, gateways) already installed in the indoor environment P. More specifically, the network devices are connected to the terminal devices 11 and the home server 12 in a wired or wireless manner so that the terminal devices 11 can connect to the Internet 10 through the network devices. The home server 12 can determine the monitoring area D where each terminal device 11 is located simply by determining which network device receives the signal of the greatest strength from each terminal device 11.

In fact, wireless positioning can be implemented in many ways. In addition to "measuring the signal strengths in the indoor environment P in advance" and "determining the location of each terminal device 11 through network devices", other measuring techniques can be used. Referring to FIG. 1, the safety monitoring system 1 further includes two sensing devices 15 (which may be the aforesaid network devices or simply two wireless transceivers). The sensing devices 15 are configured to receive the report messages sent by the terminal devices 11 and generate a sensing signal according to the signal strength of each terminal device 11. The sensing devices 15 can also connect to the home server 12 wirelessly or in a wired manner Once wireless connection is established between each terminal device 11 and the home server 12, the home server 12 can determine the monitoring area D where each terminal device 11 is located by triangulation based on the sensing signals sent from the sensing devices 15 and the signal strengths of the report messages received by the home server 12 itself.

Moreover, in the second preferred embodiment of the present invention, the home server 12 further stores plural entries of monitoring data. Each entry of the monitoring data corresponds to one entry of the identification data and at least includes a time parameter (e.g., five o'clock or 30 minutes) and an area parameter (e.g., the vestibule, bedroom A, or the kitchen). The home server 12 compares each entry of the monitoring data with the corresponding entry of the identification data on a regular basis. Should any abnormality be found, the home server 12 sends a warning message to the cloud server 13, which relays the warning message to the mobile communication device 14 (e.g., by a text message or by vibrating the mobile communication device 14 through the safety monitoring program installed therein). The comparison method used by the home server 12 may vary as needed, and some of the major approaches are as follows:

(1) Analyzing the time parameter only: The home server 12 determines whether the time for which each terminal device 11 stays in a particular monitoring area D has exceeded the corresponding time parameter. If yes, the home server 12 sends out the warning message. For example, if elderly family member #1 stays in bathroom B for more than 30 minutes, something worth noting (e.g., fainting or slipping) may have taken place.

(2) Analyzing the area parameter only: Each area parameter corresponds to a specific monitoring area D (e.g., the kitchen). The home server 12 determines whether the monitoring area D where each terminal device 11 is located matches the corresponding area parameter. If yes, the home server 12 sends out the warning message. For example, the user may mark the kitchen as a dangerous area, and the home server 12 will generate the warning message as soon as a child enters the kitchen.

(3) Analyzing both the time parameter and the area parameter: The home server 12 determines whether the terminal devices 11 are respectively in their expected monitoring areas according to the current time. For example, assuming a time parameter to be "five o'clock" and the corresponding area parameter to be "bedroom A", the home server 12 determines whether the corresponding terminal device 11 (e.g., a child's mobile phone) is in the monitoring area D "bedroom A" when it is five o'clock. If no, the home server 12 sends out the warning message.

In the third preferred embodiment of the present invention, the safety monitoring system further includes at least one monitoring device 16. The monitoring device 16 can be provided in any of the monitoring areas D (e.g., the vestibule) and is connected to the home server 12 either electrically or wirelessly. The monitoring device 16 is configured to detect if anyone enters or exits that particular monitoring area D (e.g., to perform image recognition with a camera or detect whether the door at the vestibule is open). When determining that someone enters the monitoring area D, the monitoring device 16 sends a notification message to the home server 12. If the home server 12, upon receipt of the notification message, determines that none of the terminal devices 11 is in that monitoring area D, the home server 12 will send the warning message to the cloud server 13 and display corresponding information (e.g., "An unidentified person enters the vestibule.")

In the foregoing embodiment, the monitoring device 16 is provided with a camera module for capturing a surveillance image of the monitoring area D and will send the notification message to the home server 12 along with the surveillance image. Upon receiving the notification message and the surveillance image, the home server 12 determines whether the monitoring area D has the corresponding terminal device 11 present. If no, meaning an unidentified person has entered the monitoring area D, the home server 12 sends both the warning message and the surveillance image to the cloud server 13.

While the invention herein disclosed has been described by means of specific embodiments, numerous modifications and variations could be made thereto by those skilled in the art without departing from the scope of the invention set forth in the claims.

What is claimed is:

1. A safety monitoring system capable of detecting locations of terminal devices, the safety monitoring system being applicable to an indoor environment and comprising:

a plurality of terminal devices, each said terminal device periodically sending out a report message through a wireless transmission technique; and a home server storing positioning data, plural entries of identification data and plural entries of monitoring data, wherein the positioning data are created by the home server through applying a wireless positioning technique to analysis of signal strengths received from said terminal device located respectively at different rooms in the indoor environment, the home server divides the indoor environment into a plurality of monitoring areas set corresponding to the positioning data by a user; each entry of the identification data corresponds to one of the terminal devices and, when the terminal devices are in the indoor environment, the home server makes wireless connection with each said terminal device separately, receives the report message sent by each said terminal device, uses the wireless positioning technique to analyze a signal strength received from each said terminal device and determine the monitoring area where each said terminal device is located according to the positioning data, and uploads each entry of the identification data and the monitoring area corresponding to each entry of the identification data to a cloud server through the Internet; each entry of the monitoring data corresponds to one entry of the identification data, and the home server sends a warning message to the cloud server upon determining that an entry of the monitoring data does not match the corresponding entry of the identification data and the monitoring area corresponding to the corresponding entry of the identification data.

2. The safety monitoring system of claim 1, wherein each entry of the monitoring data comprises a time parameter and an area parameter corresponding to a particular one of the monitoring areas, and the home server sends the warning message to the cloud server upon determining that a said terminal device stays in a said monitoring area for a time exceeding the time parameter in a corresponding entry of the monitoring data or that a current time matches the time parameter in an entry of the monitoring data but the monitoring area where a corresponding said terminal device is located does not match the area parameter in the entry of the monitoring data.

3. The safety monitoring system of claim 2, further comprising a mobile communication device, wherein the mobile communication device is connected to the cloud server through the Internet, and the cloud server sends the warning message to the mobile communication device upon receiving the warning message.

4. The safety monitoring system of claim 1, further comprising at least two sensing devices, wherein the sensing devices are separately provided in the indoor environment and are separately connected to the home server either electrically or wirelessly, and each said sensing device is configured to receive the report message sent by each said terminal device, generate a sensing signal according to a signal strength of each said report message received, and send the sensing signals to the home server in order for the home server to determine the monitoring area where each said terminal device is located through triangulation according to signal strengths of the report messages received by the home server and the sensing signals.

5. The safety monitoring system of claim 2, further comprising at least two sensing devices, wherein the sensing devices are separately provided in the indoor environment and are separately connected to the home server either electrically or wirelessly, and each said sensing device is configured to receive the report message sent by each said terminal device, generate a sensing signal according to a signal strength of each said report message received, and send the sensing signals to the home server in order for the home server to determine the monitoring area where each said terminal device is located through triangulation according to signal strengths of the report messages received by the home server and the sensing signals.

6. The safety monitoring system of claim 3, further comprising at least two sensing devices, wherein the sensing devices are separately provided in the indoor environment and are separately connected to the home server either electrically or wirelessly, and each said sensing device is configured to receive the report message sent by each said terminal device, generate a sensing signal according to a signal strength of each said report message received, and send the sensing signals to the home server in order for the home server to determine the monitoring area where each said terminal device is located through triangulation according to signal strengths of the report messages received by the home server and the sensing signals.

7. The safety monitoring system of claim 4, further comprising at least one monitoring device, wherein the monitoring device is provided in one of the monitoring areas and is connected to the home server either electrically or wirelessly, and when the monitoring device determines that a person enters the one of the monitoring areas, the monitoring device sends a notification message to the home server, and the home server sends the warning message to the cloud server if it is determined by the home server that the one of the monitoring areas does not have a corresponding said terminal device present.

8. The safety monitoring system of claim 5, further comprising at least one monitoring device, wherein the monitoring device is provided in one of the monitoring areas and is connected to the home server either electrically or wirelessly, and when the monitoring device determines that a person enters the one of the monitoring areas, the monitoring device sends a notification message to the home server, and the home server sends the warning message to the cloud server if it is determined by the home server that the one of the monitoring areas does not have a corresponding said terminal device present.

9. The safety monitoring system of claim 6, further comprising at least one monitoring device, wherein the monitoring device is provided in one of the monitoring areas and is connected to the home server either electrically or wirelessly, and when the monitoring device determines that a person enters the one of the monitoring areas, the monitoring device sends a notification message to the home server, and the home server sends the warning message to the cloud server if it is determined by the home server that the one of the monitoring areas does not have a corresponding said terminal device present.

10. The safety monitoring system of claim 7, wherein the monitoring device is provided with a camera module for capturing a surveillance image of the one of the monitoring areas, and the monitoring device sends the notification message to the home server along with the surveillance image.

11. The safety monitoring system of claim 8, wherein the monitoring device is provided with a camera module for capturing a surveillance image of the one of the monitoring areas, and the monitoring device sends the notification message to the home server along with the surveillance image.

12. The safety monitoring system of claim 9, wherein the monitoring device is provided with a camera module for capturing a surveillance image of the one of the monitoring areas, and the monitoring device sends the notification message to the home server along with the surveillance image.

* * * * *